US011983271B2

United States Patent
dos Santos Silva et al.

(10) Patent No.: US 11,983,271 B2
(45) Date of Patent: May 14, 2024

(54) INLINE DETECTION AND PREVENTION OF ADVERSARIAL ATTACKS

(71) Applicant: International Business Machines Corporation, Armonk, NY (US)

(72) Inventors: Bruno dos Santos Silva, McKinney, TX (US); Cheng-Ta Lee, Chamblee, GA (US); Ron Williams, Austin, TX (US); Bo-Yu Kuo, Kaohsiung (TW); Chao-Min Chang, Taipei (TW); Sridhar Muppidi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 16/952,494

(22) Filed: Nov. 19, 2020

(65) Prior Publication Data

US 2022/0156376 A1 May 19, 2022

(51) Int. Cl.
  *G06F 21/55* (2013.01)
  *G06F 21/56* (2013.01)
  *G06N 5/04* (2023.01)
  *G06N 20/00* (2019.01)

(52) U.S. Cl.
  CPC .......... *G06F 21/566* (2013.01); *G06F 21/554* (2013.01); *G06N 5/04* (2013.01); *G06N 20/00* (2019.01); *G06F 2221/034* (2013.01)

(58) Field of Classification Search
  CPC ..... G06F 21/566; G06F 21/554; G06N 20/00; G06N 5/04
  USPC ......................................................... 726/23
  See application file for complete search history.

(56) References Cited

U.S. PATENT DOCUMENTS

| | | | |
|---|---|---|---|
| 10,484,409 B2 | 11/2019 | Ogawa | |
| 10,572,679 B2 | 2/2020 | Frank | |
| 10,657,259 B2 | 5/2020 | Lee | |
| 10,671,735 B2 | 6/2020 | Gupta | |
| 2019/0362269 A1* | 11/2019 | Barad | G06N 20/20 |
| 2020/0167471 A1* | 5/2020 | Rouhani | G06N 7/01 |
| 2020/0201993 A1* | 6/2020 | Anders | G06N 3/084 |
| 2020/0302287 A1* | 9/2020 | Tachibana | G06N 3/04 |
| 2021/0089957 A1* | 3/2021 | Ermans | G06N 3/045 |
| 2021/0125104 A1* | 4/2021 | Christiansen | G06N 20/10 |
| 2021/0224425 A1* | 7/2021 | Nasr-Azadani | G06N 20/20 |
| 2021/0303675 A1* | 9/2021 | Petersen | G06N 20/20 |
| 2021/0377282 A1* | 12/2021 | Wojnowicz | G06F 21/552 |
| 2022/0058273 A1* | 2/2022 | Rathore | G06N 20/00 |
| 2022/0092464 A1* | 3/2022 | Wistuba | G06F 21/554 |
| 2022/0094709 A1* | 3/2022 | Sharma | G06N 5/04 |

(Continued)

OTHER PUBLICATIONS

Anonymous. "Fast adversarial retraining." Published Oct. 7, 2019, 4 pages. Published by IP.com. <https://priorart.ip.com/IPCOM/000259987>.

(Continued)

*Primary Examiner* — Dereena T Cattungal
(74) *Attorney, Agent, or Firm* — Michael A. Petrocelli

(57) ABSTRACT

A processor may generate an enforcement point. The enforcement point may include one or more adversarial detection models. The processor may receive user input data. The processor may analyze, at the enforcement point, the user input data. The processor may determine, from the analyzing, whether there is an adversarial attack in the user input data. The processor may generate an alert based on the determining.

20 Claims, 5 Drawing Sheets

(56) References Cited

U.S. PATENT DOCUMENTS

| | | | | |
|---|---|---|---|---|
| 2022/0156376 | A1* | 5/2022 | dos Santos Silva | G06N 5/04 |
| 2022/0164645 | A1* | 5/2022 | Zaina | G06F 21/57 |
| 2022/0335335 | A1* | 10/2022 | Basak | G06F 21/54 |

OTHER PUBLICATIONS

Anonymous. "System & method to test and build robust classification models by generating intelligent adversarial samples using domain knowledge." Published Oct. 6, 2019. 5 pages. Published by IP.com. <https://priorart.ip.com/IPCOM/000259986>.

Anonymous. "Trusted-AI / Adversarial robustness toolbox." Accessed Nov. 13, 2020. 4 pages. Published by GitHub. <https://github.com/Trusted-AI/adversarial-robustness-toolbox>.

Carlini, et al., "Adversarial Examples are not Easily Detected: Bypassing Ten Detection Methods." Published Nov. 1, 2017. 12 pages. Published by ARXIV. <https://arxiv.org/pdf/1705.07263.pdf>.

Chakraborty, et al., "Adversarial Attacks and Defences: A Survey." Published Sep. 28, 2018. 31 pages. Published by ARXIV. <https://arxiv.org/abs/1810.00069>.

Cohen, et al., "Detecting Adversarial Samples Using Influence Functions and Nearest Neighbors." Published Mar. 19, 2020. 18 pages. Published by ARXIV. <https://arxiv.org/abs/1909.06872>.

Feinman, et al., "Detecting Adversarial Samples from Artifacts." Published Nov. 15, 2017. 9 pages. Published by ARXIV. <https://arxiv.org/abs/1703.00410>.

Ganin, et al., "Domain-Adversarial Training of Neural Networks." Published May 26, 2016. Journal of Machine Learning Research 17 (2016) pp. 1-35. Published by ARXIV. <https://arxiv.org/abs/1505.07818>.

Goodfellow, et al., "Generative Adversarial Networks." Accessed Sep. 15, 2020. 9 pages. <https://papers.nips.cc/paper/5423-generative-adversarial-nets.pdf>.

He, et al., "Adversarial Example Defenses: Ensembles of Weak Defenses are not Strong." Accessed Sep. 15, 2020. Woot '17 Conference. 11 pages. Published by Usenix. <https://www.usenix.org/conference/woot17/workshop-program/presentation/he>.

Kissner, et al., "Hacking Neural Networks." Last updated Nov. 26, 2019. 4 pages. Published by Github. <https://github.com/Kayzaks/HackingNeuralNetworks>.

LeCun, et al., "The MNIST Database of handwritten digits." Accessed Sep. 15, 2020. 8 pages. <http://yann.lecun.com/exdb/mnist/>.

Mell, et al., "The NIST Definition of Cloud Computing," Recommendations of the National Institute of Standards and Technology, U.S. Department of Commerce, Special Publication 800-145, Sep. 2011, 7 pgs.

Mikhailov, et al., "How Adversarial Attacks Work." Oublished Nov. 2, 2017. 20 pages. Published by Y Combinator. <https://blog.ycombinator.com/how-adversarial-attacks-work/>.

Pang, et al., "Towards Robust Detection of Adversarial Examples." 32nd Conference on Neural Information Processing Systems (NeurIPS 2018), Montreal, Canada, 11 pages.

Somaraju, et al., "Protection Against Adversarial Attacks on Machine Learning and Artificial Intelligence." Published Jan. 29, 2018. 8 pages. Published by IP.com. <https://priorart.ip.com/IPCOM/000252595>.

Tiffanyk, et al., "adversarial-detect / demo.ipynb." Accessed Nov. 18, 2020. 10 pages. Published by Github. <https://github.ibm.com/tpe-security-hackday/adversarial-detect/blob/master/demo.ipynb>.

Tramer, et al., "Ensemble Adversarial Training: Attacks and Defenses." Published Apr. 26, 20. 22 pages. Published as a conference paper at ICLR 2018. Published by ARXIV. <https://arxiv.org/abs/1705.07204>.

Tramer, et al., "The Space of Transferable Adversarial Examples." Published May 23, 2017. 15 pages. Published by ARXIV. <https://arxiv.org/abs/1704.03453>.

Wang, et al., "Adversarial Sample Detection for Deep Neural Network through Model Mutation Testing." Published Jan. 18, 2019. 12 pages. Published by ARXIV. <https://arxiv.org/abs/1812.05793>.

Xu, et al., "Feature Squeezing: Detecting Adversarial Examples in Deep Neural Networks." Published Dec. 5, 2017. 15 pages. In Network and Distributed Systems Security Symposium (NDSS) 2018, San Diego, Feb. 2018. Published by ARXIV. <https://arxiv.org/abs/1704.01155>.

Zantedeschi, et al., "Efficient Defenses Against Adversarial Attacks." AISec'17, Nov. 3, 2017. 11 pages. Dallas, TX, USA.

* cited by examiner

INLINE DETECTION AND PREVENTION OF ADVERSARIAL ATTACKS

BACKGROUND

The present disclosure relates generally to the field of security analysis, and more specifically to detecting and prevention adversarial attacks.

Companies around the world are now often using artificial intelligence (AI) as a key term for transformations. As the exploration of AI grows, as with any technology, some actors have started to explore ways to compromise neural networks. As new methods for compromising such technologies appear, security professionals are urged to come up with technologies to prevent threat-actors from being successful in their endeavors.

It is still not clear how threat-actors utilize these vulnerabilities in real-world attacks. However, it is starting to be seen that there is a one-to-one mapping between an attack mechanism applied to traditional software and AI/Machine learning (ML) models. For example, it has been researched that some adversarial attacks are transferable so that black-box attacks on AI/ML models do work. As such, it is becoming apparent that AI/ML models, even though they don't reveal any detail (e.g., hyperparameters), can and should be made to be safer and more secure.

Traditionally, one approach to harden existing ML models is via adversarial training, which has become a popular research topic in recent years. Adversarial training makes ML models immune to adversarial attacks, but it brings new problems. First, adversarial training is slow. It usually takes at least 5 epochs to finish the training. Accordingly, the response time of acting on new adversarial attacks is very long, and it also lengthens the release cycle. Further, the slow response time to act on adversarial attacks makes AI/ML models almost unpatchable, at least in the sense that AI/ML models cannot be patched in real-time. Second, adversarial training makes adversarial attacks invisible because the ML models won't get caught by adversarial samples anymore.

According, it is desirable to have visibility of if a threat-actor is trying to attack an AI/ML model and to be able to patch the AI/ML model in real-time.

SUMMARY

Embodiments of the present disclosure include a method, computer program product, and system for inline detection and prevention of adversarial attacks.

A processor may generate an enforcement point. The enforcement point may include one or more adversarial detection models. The processor may receive user input data. The processor may analyze, at the enforcement point, the user input data. The processor may determine, from the analyzing, whether there is an adversarial attack in the user input data. The processor may generate an alert based on the determining.

In some embodiments, the enforcement point may be in communication with a machine learning framework, and the machine learning framework may include updated information on identified adversarial attacks based on machine learning models.

In some embodiments, the processor may update information at the enforcement point in regard to the updated information on identified adversarial attacks. The processor may forward the updated information to one or more machine learning applications.

In some embodiments, analyzing the user input data may include the processor analyzing the user input data in regard to the updated information on identified adversarial attacks.

In some embodiments, determining whether there is an adversarial attack in the user input data may further include the processor identifying, from the updated information on identified adversarial attacks, there is no adversary. The processor may forward the user input data to one or more machine learning applications. The forwarding of the user input data may include metadata that indicates a level of confidence in regard to the adversary.

In some embodiments, determining whether there is an adversarial attack in the user input data may further include the processor identifying, from the updated information on identified adversarial attacks, a confirmed adversary. The processor may stop the forwarding of the user input data to one or more machine learning applications.

In some embodiments, the processor may forward the user input data to the machine learning framework.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
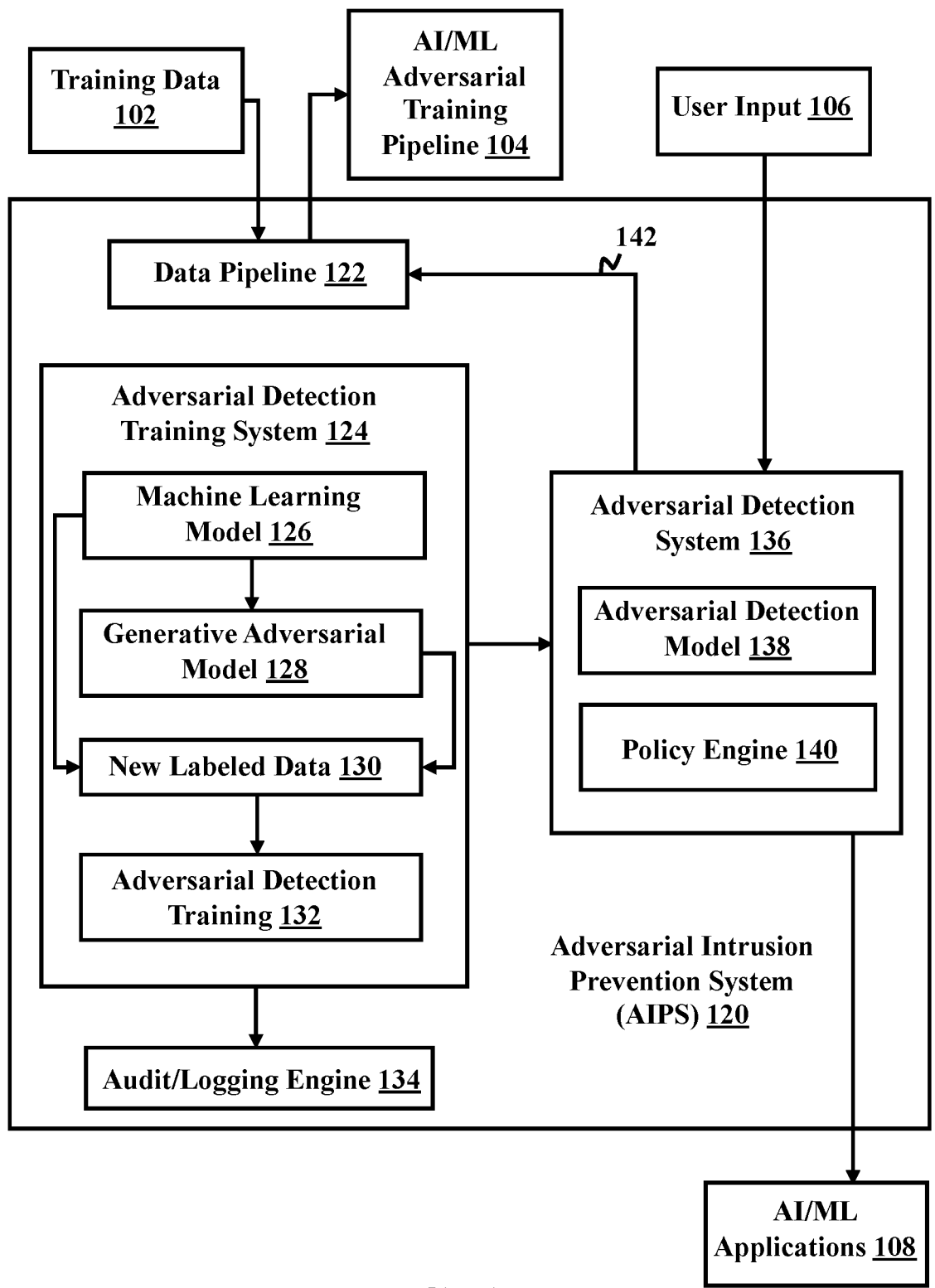
FIG. 1 is a block diagram of an exemplary network for inline detection and prevention of adversarial attacks, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of security analysis, and more specifically to detecting and prevention adversarial attacks. While the present disclosure is not necessarily limited to such applications, various aspects of the disclosure may be appreciated through a discussion of various examples using this context.

Discussed herein is a solution for the unpatch-ability of AI/ML models in real-time and the invisibility of adversaries after an AI/ML model has been trained. The solution discussed herein is to generate/create a proxy-like enforcement point, which could be a physical/virtual appliance, a container image, a micro-service, or a cloud function sitting between user inputs; and AI/ML models to detect and block the inputs containing adversaries/adversarial attacks.

It is noted that adversarial detection is different from adversarial training as the latter one is about making the ML model immune to adversarial attacks, meaning the adversarial samples cannot degrade accuracy, and the former one is about identifying adversarial samples. Accordingly, one performance characteristic in adversarial detection making the present solution viable is that the number of features used in creating adversarial detection models (ADM) is constant regardless of the original model. For example, if the original model takes a 64×64-pixel image as an input, the model of adversarial detection might only need 2 features that depend on the features you are extracting. If the input becomes a 128×128-pixel image, the detection model still needs only 2 features. As a result, training/re-training an ADM is much faster than doing adversarial training on the AI/ML models needed to be protected.

Adversarial detection is a stepping stone for the solution (e.g., method, system, computer program product) presented herein; the solution is about generating/creating an enforcement point and applying adversarial detection methods and data flows around the enforcement point.

There are four main advantages of having an enforcement point such as the one described throughout this disclosure, such as:

First, because training adversarial detection models is much faster, a "virtual patch" can be applied to AI/ML models. That is, when a new type of adversarial attack shows up, deploy a new adversarial detection model can first be deployed on the enforcement point to extend the amount of time available for adversarial training.

Second, because training adversarial detection models is much faster, a new adversarial detection model can be deployed on the enforcement point while adversarial training is still in progress, which helps shorten the release cycle of AI/ML models.

Third, the enforcement point doing adversarial detection brings back the missing visibility to security administrators. Accordingly, it is known if anyone is trying to attack AI/ML systems, and a mitigation plan can be generated while/when seeing such attacks.

Lastly, the enforcement point can collect more adversarial samples for future adversarial training. The adversarial samples from real attacks can make future adversarial training much more vigorous and complete.

In some embodiments, there are multiple data flows around the novel enforcement point, for instance:

One data flow may be an interaction with AI/ML frameworks and continuous integration and continuous delivery (CI/CD) pipelines of AI/ML models. In such a data flow, the enforcement point receives AI/ML models from AI/ML frameworks or CI/CD pipelines. The enforcement point then does the adversarial detection training and then deploys the ADM.

Another data flow are the interactions with user inputs. In such a data flow, the enforcement point sits between a user input (e.g., a picture, an audio recording, a string, etc.) and the AI/ML application making predictions. The enforcement point takes user inputs via a function call, a network connection, a cloud function call, a topic on message queue, etc. After receiving the inputs, the enforcement point uses the ADM to inspect user inputs, and the output of the ADM determines if given inputs contain adversarial attacks. The enforcement point then, bases on a policy, an action put on user inputs (e.g., halting or forwarding the user input).

Another data flow is the interactions with an AI/ML application. In such a data flow, the ADM could either drop the inputs or forward the input to a destination AI/ML application based on the output of ADM. The ADM can also generate alerts/events based on the output of the ADM. As disclosed, this is a corollary concept to a network IPS vs. network IDS; one provides blocking, whereas the other one provides detection. When forwarding the input to AI/ML application, the enforcement point could also attach additional metadata along with the input. For example, a confidence score of the input contains adversarial attacks.

Another data flow is the interactions with an adversarial training system. When the enforcement point is put to work, the enforcement point can not only detect/block adversarial attacks but can also collect adversarial samples. The new samples collected from real-world attacks can make future adversarial training more robust.

Referring now to FIG. 1, a block diagram of a network 100 for inline detection and prevention of adversarial attacks, in accordance with aspects of the present disclosure. In some embodiments, the system 102 includes training data 102, an AI/ML adversarial training pipeline 104, user input 106, AI/ML applications 108, and an adversarial intrusion prevention system (AIPS) 120.

In some embodiments, the AIPS 120 includes a data pipeline 122, an adversarial detection training system 124, an audit/logging engine 134, an adversarial detection system 136 (e.g., enforcement point), and a feedback 142 (of adversarial samples). In some embodiments, the adversarial detection training system 124 includes a machine learning model 126, a generative adversarial model 128, new labeled data 130, and adversarial detection training 132. In some embodiments, the adversarial detection training system 124 may use an adversarial robustness toolbox (not shown) to generated adversarial data. In some embodiments, the data pipeline 122 may communicate with each of the machine learning model 126, the generative adversarial model 128, and adversarial detection training 132. In some embodiments, the adversarial detection system 136 includes an adversarial detection model 138 and a policy engine 140.

In some embodiments, for the adversarial detection training system 124: a) the machine learning model 126 is a model that needs protection (from an adversarial attack) and which is input into the adversarial detection training system 124; b) the data pipeline 122 receives the training data 102 and forwards the training data 102 into the generative adversarial model 128 to generate adversarial samples, and the data pipeline 122 (simultaneously) forwards the training data 102 to the machine learning model 126 to generate the expected results the model should have. The data pipeline 122 can also feed real-world adversarial samples to the adversarial detection training system 124, which may be forwarded from the adversarial detection system 136 via the feedback 142. In some embodiments, the data pipeline 122 can also forward the real-world adversarial samples to the AI/ML adversarial training pipeline 104 to be used by one or more other adversarial intrusion prevention systems 120 (not shown); c) the generative adversarial model 128 may be responsible for generating adversarial samples; d) the combination of steps b) and c) generates the new labeled data 130 with labels of 'adversarial' and/or 'normal' (e.g., not adversarial). In some embodiments, the new labeled data 130 is then fed into the adversarial detection system 136; e) in some embodiments, the new labeled data 130 is fed to the adversarial detection training 132, which may be a ML model and which may use the new labeled data 130 to train the adversarial detection model 138.

In some embodiments, for the adversarial detection system 124: a) the adversarial detection model 138 may be a ML model trained with the new labeled data 130 to be able to classify adversarial and non-adversarial samples (e.g., pictures, words, videos, etc.). The detected adversarial samples can feedback 142 to the adversarial training detection system 124 as future training data to improve the accuracy of the adversarial training detection system 124; b) the adversarial detection model is then updated when the adversarial detection training 132 running in the background is ready. The trained adversarial detection model 138 can then predict the label of adversarial samples correctly; c) based on a data-classification of the adversarial detection model 138, the policy engine 140 can forward or drop adversarial inputs (e.g., as detected from the user input 106). The policy engine 140 is configurable so that users can define when and where to forward the input (e.g., AI/ML applications 108 or feedback 142 to adversarial detection training [model] 132). In some embodiments, the audit/logging engine 134 keeps track of the actions and data flows in the AIPS 120.

Figure 2:
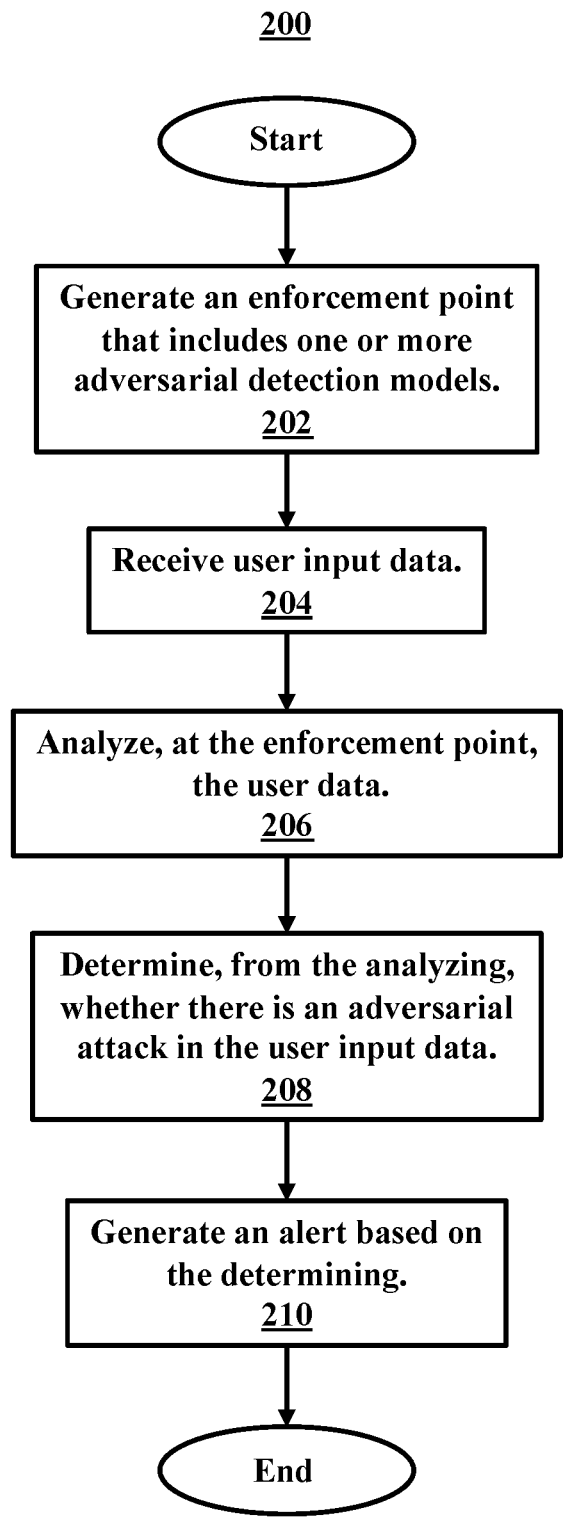
FIG. 2 is a flowchart of an exemplary method for inline detection and prevention of adversarial attacks, in accordance with aspects of the present disclosure.

Referring now to FIG. 2, illustrated is a flowchart of an exemplary method 200 for inline detection and prevention of adversarial attacks, in accordance with aspects of the present disclosure. In some embodiments, the method 200 may be performed by a processor, such as a processor in the network 100 and/or any of the systems/components in the network 100.

In some embodiments, the method 200 begins at operation 202, where the processor generates an enforcement point. The enforcement point may include one or more adversarial detection models. In some embodiments, the method 200 may proceed to operation 204, where the processor receives user input data. In some embodiments, the method 200 proceeds to operation 206.

At operation 206, the processor analyzes, at the enforcement point, the user input data. In some embodiments, the method 200 proceeds to operation 208, where the processor determines (e.g., predicts), from the analyzing, whether there is an adversarial attack in the user input data. In some embodiments, the method 200 proceeds to operation 210. At operation 210, the processor may generate an alert based on the determining (e.g., adversary detected=user alerted with an indicator, normal data=system remains silent, etc.). In some embodiments, after operation 210, the method 200 may end.

In some embodiments, discussed below, there are one or more operations of the method 200 not depicted for the sake of brevity. Accordingly, in some embodiments, the enforcement point may be in communication with a machine learning framework, and the machine learning framework may include updated information on identified adversarial attacks based on machine learning models.

In some embodiments, the processor may update information at the enforcement point in regard to the updated information on identified adversarial attacks. The processor may forward the updated information to one or more machine learning applications. In some embodiments, analyzing the user input data may include the processor analyzing the user input data in regard to the updated information on identified adversarial attacks.

In some embodiments, determining whether there is an adversarial attack in the user input data may further include the processor identifying, from the updated information on identified adversarial attacks, there is no adversary. The processor may forward the user input data to one or more machine learning applications. The forwarding of the user input data may include metadata that indicates a level of confidence in regard to the adversary.

In some embodiments, determining whether there is an adversarial attack in the user input data may further include the processor identifying, from the updated information on identified adversarial attacks, a confirmed adversary. The processor may stop the forwarding of the user input data to one or more machine learning applications. In some embodiments, the processor may forward the user input data to the machine learning framework.

Now discussed is a comprehensive example in regard to the method 200 and the disclosure as a whole. In some embodiments, adversarial samples are generated from conventional, labeled training data, for instance, Modified National Institute of Standards and Technology (MNIST) data (e.g., handwritten digits) can be used for training and identifying adversarial samples.

Further, the generation of the adversarial samples from the training data may be generated using existing one or more adversarial-robustness-toolboxes (ART), which support several well-known attack methods such as FGSM (Fast Gradient Sign Attack), BIM (Basic iterative method) and JSMA (Jacobian-based saliency map attack). As discussed herein, attack method FGSM is used as an example. A FastGradientMethod function of an ART with the ML model and conventional, labeled training data as an input parameter is used to generate adversarial samples of/from the FGSM. In some embodiments, if it is desired to also detect adversarial samples of other attack methods, the function name of the attack algorithm is simply replaced with the attack algorithm that is desired to be detected.

Furthering the example, a kernel density feature from the original training data and the adversarial samples is extracted. In order to extract the kernel density feature, it is proposed herein to: i) extract the feature space of the last hidden layer of the ML model for each training data and adversarial samples; ii) choose/select the appropriate kernel function and parameter for the ML model (e.g., a Gaussian function, etc.); iii) calculate the kernel of each training data with the training data with the kernel function; iv) calculate the kernel of each adversarial sample with other training data with the kernel function. A kernel definition may be determined from various known means.

Continuing to further the example, a Bayesian uncertainty feature from the original training data and adversarial samples is extracted. In order to extract the Bayesian uncertainty feature, it is contemplated herein that: i) the training data of the ML model is sampled X times for each training data to get a predicted output for each class. Where, if there is N training data with T classes, the output with have a shape (X,N,T); ii) the variance of predicted output along the X sample times is calculated, where the an output shape is (N,T); iii) the mean of T class for each training data is calculated to get Bayesian uncertainty, where the output being shape (N,1); steps i)-iii) are repeated with each adversarial samples.

Continuing the example, a nearest neighbor influence function (NNIF) feature(s) is extracted using various known means. Then, the adversarial detection model is trained with generated data (e.g., new labeled data). In some embodiments, the adversarial detection model may be trained by: i) using the kernel density and Bayesian uncertainty as features for both training data and adversarial samples; ii) labeling the original training data with a non-adversarial label and the adversarial samples with an adversarial label; iii) training the adversarial intrusion prevention system model (e.g., adversarial detection model) with the labeled training data with a logistic regression model. Lastly, upon complete training of the adversarial intrusion prevention system, the novel pipeline is deployed so the other ML models can be trained with real-world adversarial examples.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
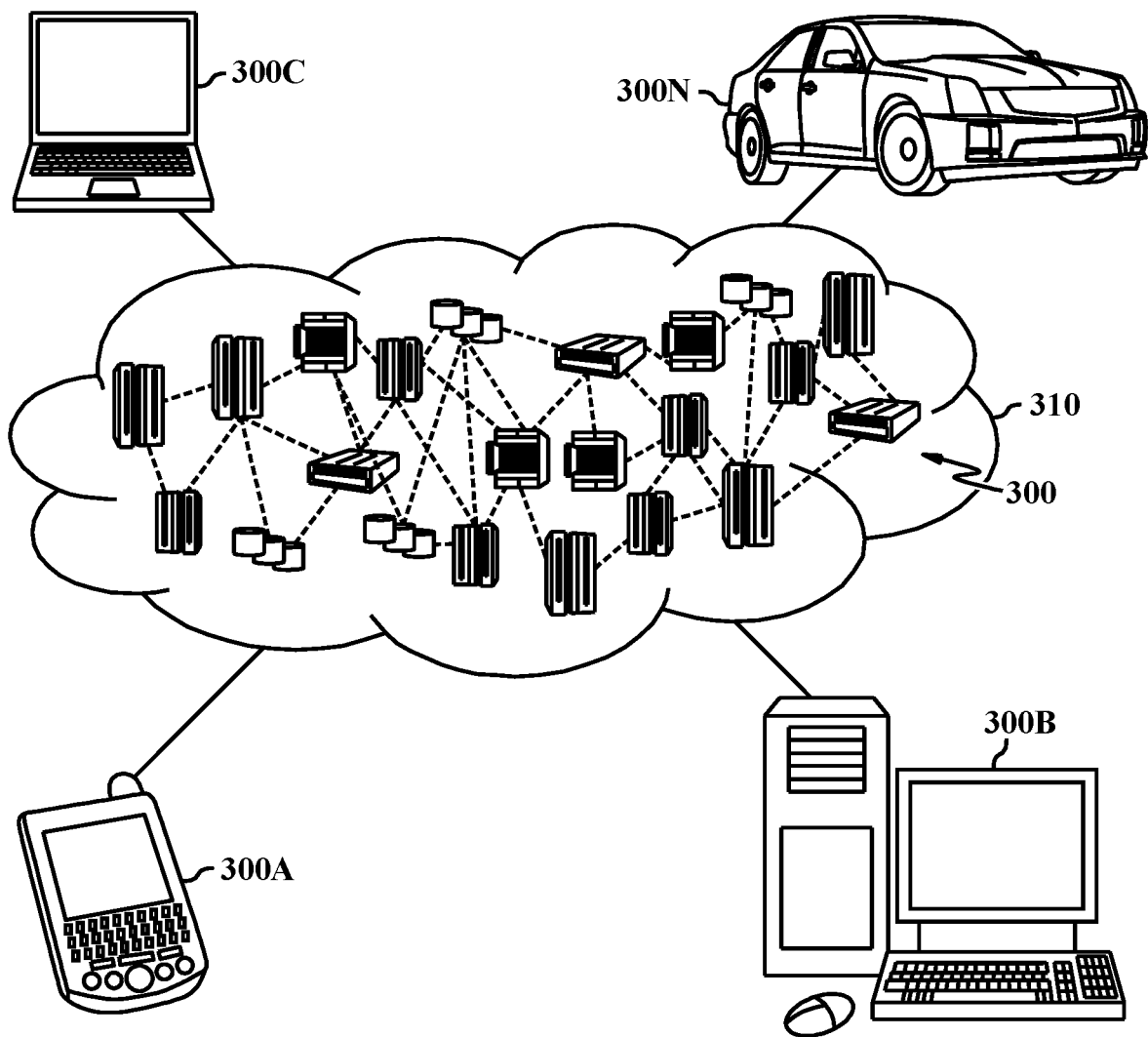
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
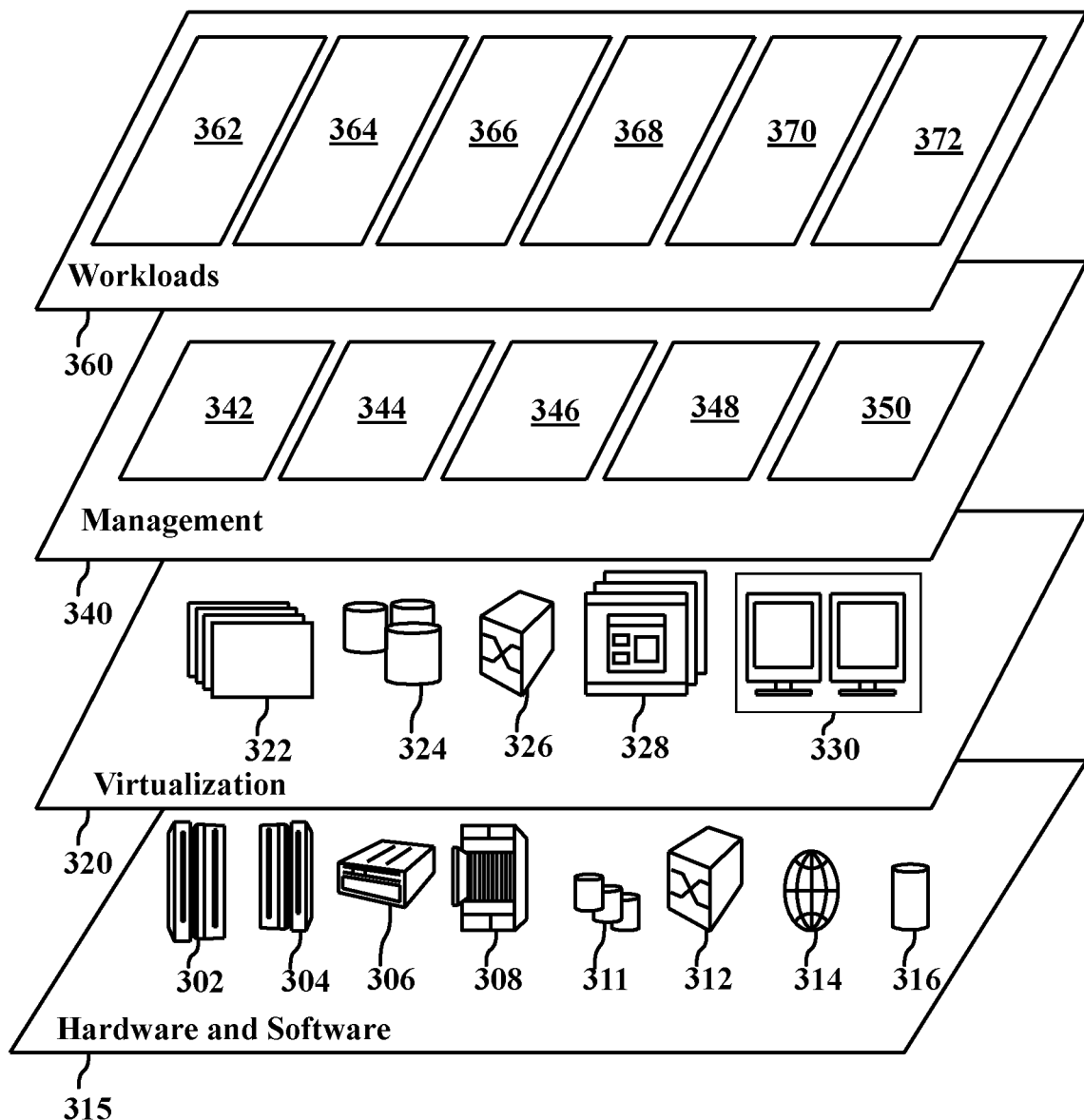
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and detecting and preventing adversarial attacks 372.

Figure 4:
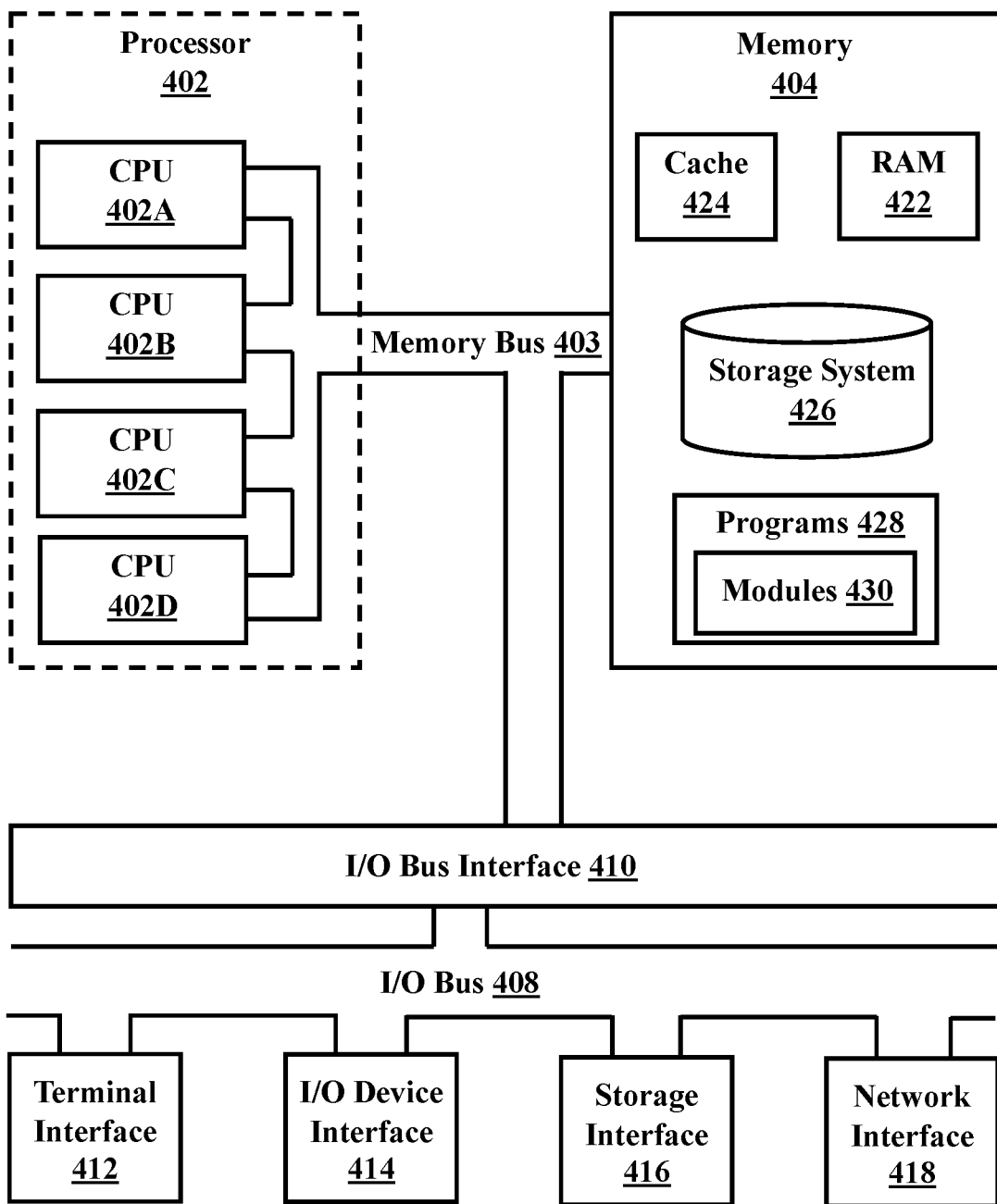
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for inline detection and prevention of adversarial attacks, the method comprising:
    generating, by a processor, an enforcement point, wherein the enforcement point includes two or more adversarial detection models, each of the two or more adversarial detection models including a machine learning model trained using labeled training data for classifying adversarial samples and non-adversarial samples;
    extracting a kernel density feature and a Bayesian uncertainty feature from the labeled training data and the adversarial samples;
    training the two or more adversarial detection models using the kernel density feature and the Bayesian uncertainty feature as new training data;
    receiving user input data;
    analyzing, at the enforcement point in real-time, the user input data;
    determining, from the analyzing, whether there is an adversarial attack in the user input data, wherein the determining includes:
        collecting, in real-time, sample information associated with the adversarial attack, wherein the adversarial attack is not one of identified adversarial attacks; and
    generating an alert based on the determining.

2. The method of claim 1, wherein the enforcement point is in communication with a machine learning framework, wherein the machine learning framework includes updated information on identified adversarial attacks based on machine learning models, and wherein the updated information includes the sample information associated with the adversarial attack.

3. The method of claim 2, further comprising:
    updating information at the enforcement point in regard to the updated information on identified adversarial attacks; and
    forwarding the updated information to one or more machine learning applications.

4. The method of claim 2, wherein analyzing the user input data includes:
    analyzing the user input data in regard to the updated information on identified adversarial attacks.

5. The method of claim 4, wherein determining whether there is an adversarial attack in the user input data further includes:
    identifying, from the updated information on identified adversarial attacks, there is no adversary; and
    forwarding the user input data to one or more machine learning applications, wherein the forwarding of the user input data includes metadata that indicates a level of confidence in regard to the adversary.

6. The method of claim 4, wherein determining whether there is an adversarial attack in the user input data further includes:
    identifying, from the updated information on identified adversarial attacks, a confirmed adversary; and
    stopping the forwarding of the user input data to one or more machine learning applications.

7. The method of claim 6, further comprising:
    forwarding the user input data to the machine learning framework.

8. A system comprising:
    a memory; and
    a processor in communication with the memory, the processor being configured to perform operations comprising:
    generating an enforcement point, wherein the enforcement point includes two or more adversarial detection models, each of the two or more adversarial detection models including a machine learning model trained using labeled training data for classifying adversarial samples and non-adversarial samples;
    extracting a kernel density feature and a Bayesian uncertainty feature from the labeled training data and the adversarial samples;
    training the two or more adversarial detection models using the kernel density feature and the Bayesian uncertainty feature as new training data;
    receiving user input data;
    analyzing, at the enforcement point in real-time, the user input data;
    determining, from the analyzing, whether there is an adversarial attack in the user input data, wherein the determining includes:
        collecting, in real-time, sample information associated with the adversarial attack, wherein the adversarial attack is not one of identified adversarial attacks; and
    generating an alert based on the determining.

9. The system of claim 8, wherein the enforcement point is in communication with a machine learning framework, wherein the machine learning framework includes updated information on identified adversarial attacks based on machine learning models, and wherein the updated information includes the sample information associated with the adversarial attack.

10. The system of claim 9, the processor being further configured to perform operations comprising:
    updating information at the enforcement point in regard to the updated information on identified adversarial attacks; and
    forwarding the updated information to one or more machine learning applications.

11. The system of claim 9, wherein analyzing the user input data includes:
    analyzing the user input data in regard to the updated information on identified adversarial attacks.

12. The system of claim 11, wherein determining whether there is an adversarial attack in the user input data further includes:
    identifying, from the updated information on identified adversarial attacks, there is no adversary; and
    forwarding the user input data to one or more machine learning applications, wherein the forwarding of the user input data includes metadata that indicates a level of confidence in regard to the adversary.

13. The system of claim 11, wherein determining whether there is an adversarial attack in the user input data further includes:
identifying, from the updated information on identified adversarial attacks, a confirmed adversary; and
stopping the forwarding of the user input data to one or more machine learning applications.

14. The system of claim 13, the processor being further configured to perform operations comprising:
forwarding the user input data to the machine learning framework.

15. A non-transitory computer program product comprising a computer readable storage medium having program instructions embodied therewith, the program instructions executable by a processor to cause the processor to perform operations, the operations comprising:
generating an enforcement point, wherein the enforcement point includes two or more adversarial detection models, each of the two or more adversarial detection models including a machine learning model trained using labeled training data for classifying adversarial samples and non-adversarial samples;
extracting a kernel density feature and a Bayesian uncertainty feature from the labeled training data and the adversarial samples;
training the two or more adversarial detection models using the kernel density feature and the Bayesian uncertainty feature as new training data;
receiving user input data;
analyzing, at the enforcement point in real-time, the user input data;
determining, from the analyzing, whether there is an adversarial attack in the user input data, wherein the determining includes:
collecting, in real-time, sample information associated with the adversarial attack, wherein the adversarial attack is not one of identified adversarial attacks; and
generating an alert based on the determining.

16. The computer program product of claim 15, wherein the enforcement point is in communication with a machine learning framework, wherein the machine learning framework includes updated information on identified adversarial attacks based on machine learning models, and wherein the updated information includes the sample information associated with the adversarial attack.

17. The computer program product of claim 16, the operations further comprising:
updating information at the enforcement point in regard to the updated information on identified adversarial attacks; and
forwarding the updated information to one or more machine learning applications.

18. The computer program product of claim 16, wherein analyzing the user input data includes:
analyzing the user input data in regard to the updated information on identified adversarial attacks.

19. The computer program product of claim 18, wherein determining whether there is an adversarial attack in the user input data further includes:
identifying, from the updated information on identified adversarial attacks, there is no adversary; and
forwarding the user input data to one or more machine learning applications, wherein the forwarding of the user input data includes metadata that indicates a level of confidence in regard to the adversary.

20. The computer program product of claim 18, wherein determining whether there is an adversarial attack in the user input data further includes:
identifying, from the updated information on identified adversarial attacks, a confirmed adversary; and
stopping the forwarding of the user input data to one or more machine learning applications.

* * * * *